United States Patent [19]

Culwell

[11] 4,426,924
[45] Jan. 24, 1984

[54] APPLE CORER WITH SAFETY FEATURE

[76] Inventor: Charles W. Culwell, 6319 Hillcrest, Dallas, Tex. 75205

[21] Appl. No.: 438,621

[22] Filed: Nov. 2, 1982

[51] Int. Cl.³ .................. A23N 4/12; A23N 4/14; A47J 25/00
[52] U.S. Cl. .................. 99/545; 83/DIG. 1; 99/544; 99/564; 99/565
[58] Field of Search .................. 99/542, 543, 544, 545, 99/547, 549, 550, 552, 559–561, 564, 565; 83/DIG. 1

[56] References Cited

U.S. PATENT DOCUMENTS

| 21,141 | 10/1958 | Lounsberry . | |
|---|---|---|---|
| 703,331 | 6/1902 | Acree | 99/545 |
| 1,121,066 | 12/1914 | Bray . | |
| 1,225,838 | 5/1917 | Mai . | |
| 3,994,192 | 11/1976 | Faig | 83/DIG. 1 |

FOREIGN PATENT DOCUMENTS 764717  1/1957  United Kingdom .................. 99/544

*Primary Examiner*—Timothy F. Simone
*Attorney, Agent, or Firm*—Richards, Harris & Medlock

[57] ABSTRACT

An apple coring apparatus (10) includes a first arm (16) which is pivotally connected to a base plate (12). A lever arm (20) is pivotally connected to the first arm (16). A sliding tube (36) is mounted on a guide rod (38) which is mounted normal to the base plate (12). A tubular knife (30) is pivotally connected to the lever arm (20). A blade (34) is rigidly connected to the tubular knife (30) and to the sliding tube (36). A blocking arm (54) is pivotally mounted to the plate (12) and rigidly connected to a handle (58). The blocking arm (54) includes a notch (54a) which is positioned to receive a pin (24) mounted longitudinally on the lever arm (20). When the lever arm (20) is forced downward, the pin (24) is received in the notch (54a) and the downward travel of the lever arm (20) is blocked. When the handle (58) is depressed by the operator, the arm (54) is moved out of the way of the pin (24) to permit the lever arm (20) to be driven downward so that the tubular knife (30) and blade (34) can engage an apple which is between the lever arm and the base plate (12). The operator must use both hands to complete the coring operation therefore reducing the possibility that one hand may be injured when the tubular knife (30) and blade (34) cuts through the apple.

8 Claims, 5 Drawing Figures

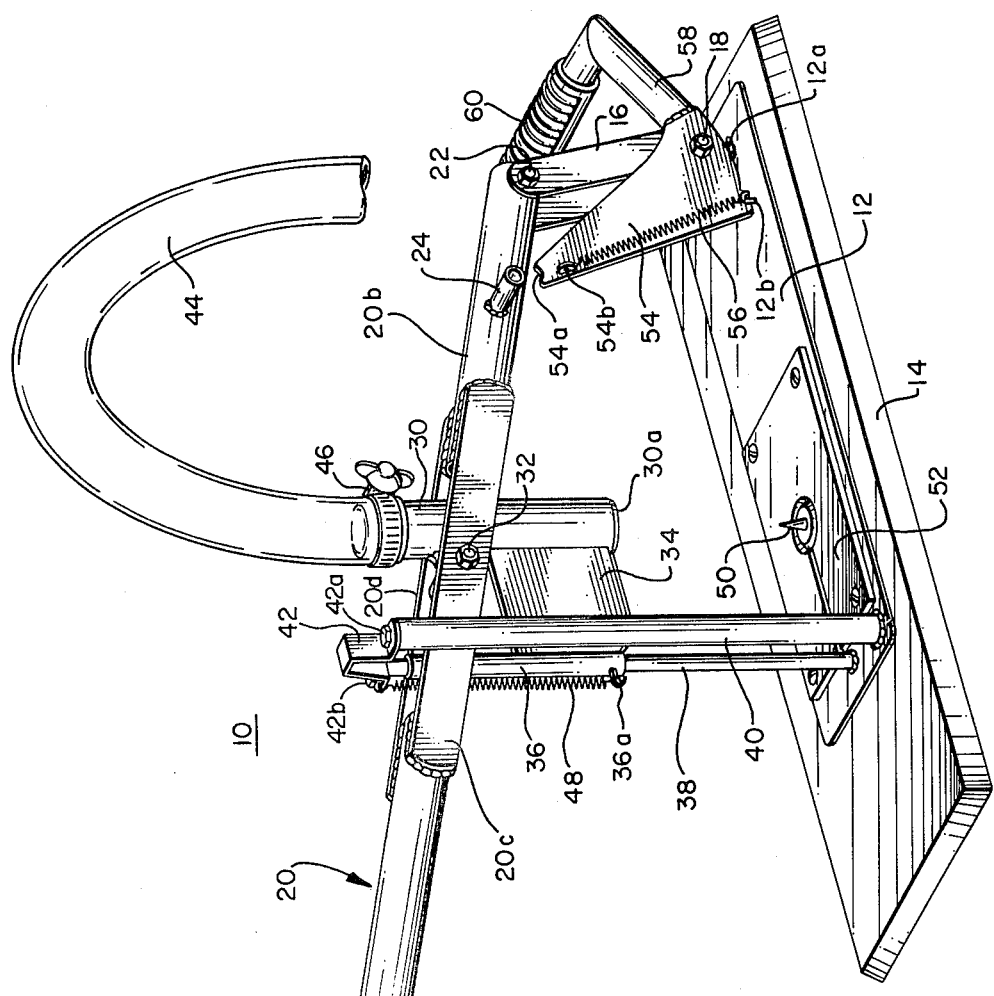
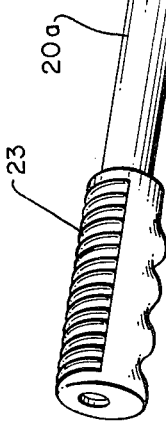
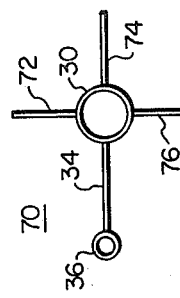
FIG. 1
FIG. 4
FIG. 5

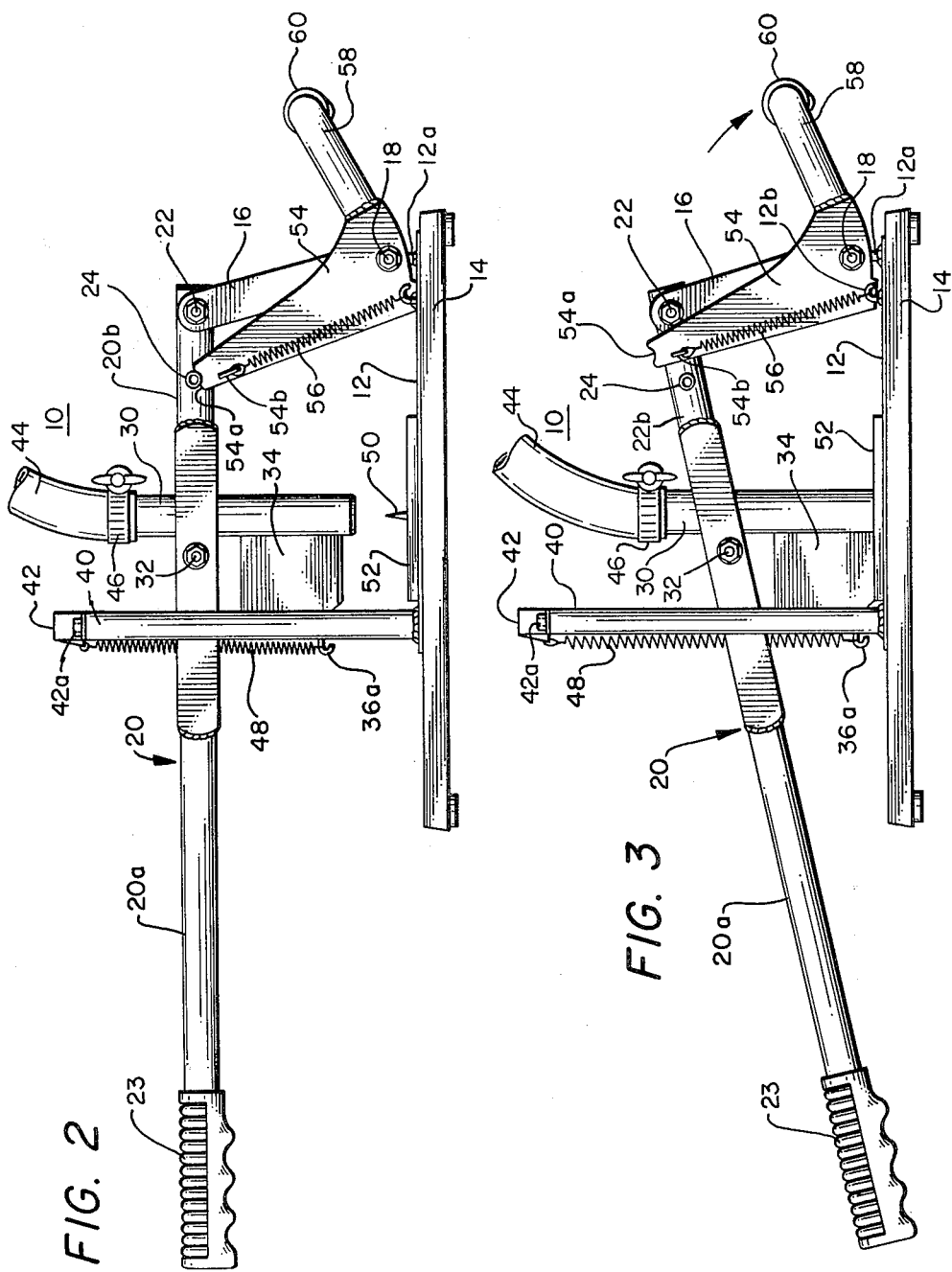

APPLE CORER WITH SAFETY FEATURE

TECHNICAL FIELD

The present invention pertains to a manual apparatus for coring apples and in particular to such an apparatus having a safety feature to prevent injury to the user.

BACKGROUND ART

The removal of cores from apples is a time consuming task, especially when large numbers of apples are being manually cored. A number of devices have been developed for removing the cores from apples. One such device is shown in U.S. Pat. No. 21,141 to Lounsberry entitled Apple Cutter.

The machinery used in the manual coring of apples typically has sharp blades and lever arms for developing substantial forces on the blade. The apples are typically held in place with one hand while the lever arm of the machine is operated with the other hand. This procedure can result in injury to the user's hand which is holding the apple in place in the machine.

In view of the need for an apparatus to manually core apples and the possibility of injury to the user, there is a requirement for an apple coring machine which is effective, while at the same time protects the user from injury.

DISCLOSURE OF THE INVENTION

A selected embodiment of the present invention comprises an apple coring apparatus having a base plate, a first arm pivotally mounted at a first end to the base plate and a lever arm which is mounted at a first end to the second end of the first arm. A guide rod is mounted normal to the base plate and a tubular knife is pivotally mounted to the lever arm. A blade is further rigidly connected to the tubular knife. A sliding tube is mounted for axial movement on the guide rod wherein the sliding tube is rigidly connected to the blade. A spring is provided for tensioning the lever arm away from the base plate. A safety apparatus supported by the base plate has a first position for blocking the travel of the lever arm toward the base plate and has a second position for permitting the lever arm to travel toward the base plate, thereby permitting the tubular knife to cut through an apple positioned on the base plate.

BRIEF DESCRIPTION OF THE DRAWINGS

For a more complete understanding of the present invention and the advantages thereof, reference is now made to the following Description taken in conjunction with the accompanying Drawings in which:

FIG. 1 is a perspective view of an apple coring apparatus in accordance with the present invention wherein the coring apparatus includes a safety feature to block the downward travel of a knife blade until an operator has removed his hand from the blade region;

FIG. 2 is an elevation view showing the coring apparatus of the present invention with the lever arm depressed as far as it will go due to the blocking arm of the safety feature;

FIG. 3 is an elevation view of the coring apparatus of the present invention wherein the blocking arm has been moved to a second position to permit the operative lever arm to be driven downward thereby permitting the coring blade to travel downward toward the base plate of the apparatus to complete the coring of an apple;

FIG. 4 is a plan view of a cutting assembly which slices apples into halves while coring them; and FIG. 5 is a plan view of a cutting assembly which slices apples into quarters while coring them.

DETAILED DESCRIPTION

Referring now to FIG. 1 there is illustrated an apple coring apparatus 10. The apparatus 10 includes a metal base plate 12 which is mounted on the wooden block 14. A first arm 16 is pivotally connected to an upstanding member 12a of the base plate 12 by means of a bolt 18.

A lever arm 20 is connected by means of a bolt 22 to the end of arm 16 opposite bolt 18. Lever arm 20 includes tubular portions 20a and 20b joined together by elongate plate segments 20c and 20d. A grip 23 is mounted on the end of lever arm 20 opposite bolt 22. A pin 24 is mounted transversely and in the horizontal plane to the tubular segment 20b of lever arm 20.

A tubular knife 30 having a downward facing, circular cutting edge 30a is pivotally mounted by means of a bolt 32 between the sections 20c and 20d of lever arm 20.

A flat, vertically oriented blade 34 is rigidly mounted longitudinally to the tubular knife 30.

A sliding tube 36 is rigidly connected to the tubular knife 30 and is mounted for axial travel on a guide rod 38 which is mounted normal to the base plate 12.

A support member 40 is mounted on the base plate 12 parallel to the guide rod 38. A bridge member 42 is connected between the top ends of the support member 40 and the guide rod 38 by nuts 42a and 42b, respectively.

A flexible plastic tube 44 is connected by means of a clamp 46 to the top of the tubular knife 30.

A spring 48 is connected between the bridge member 42 and to a hook 36a at the lower end of the sliding tube 36. The spring 48 serves to tension the lever arm 20 away from the base plate 12 and drive the arm 20 to the top limit.

A spike 50 is mounted on the base plate 12 to extend through a wooden plate 52 which is mounted to the base plate 12. The spike 50 is mounted so that it is aligned with the central axis of the tubular knife 30.

A blocking arm 54 is mounted for pivotal movement about the bolt 18. The blocking arm 54 includes a notch 54a at the end thereof opposite bolt 18. The notch 54a is shaped for receiving the pin 24. A spring 56 is connected between the end of arm 54 adjacent notch 54a and a hook 12b on the base plate 12. The spring 56 serves to pull arm 54 downward toward the base plate 12 such that the notch 54a is in position to receive the pin 24 when the lever arm 20 is forced downward.

A handle 58 comprises an L-shaped member which is connected at one end rigidly to the blocking arm 54 and therefore pivots about bolt 18. A grip 60 is mounted on the end of handle 58 opposite the arm 54.

FIG. 2 illustrates a first position of the blocking arm 54 as lever arm 20 is pressed downward toward the base plate 12 as it is blocked by the arm 54.

FIG. 3 illustrates a second position of the blocking arm 54 as lever arm 20 is pressed downward toward the base plate 12 to permit the engagement of the tubular knife 30 with the wooden plate 52.

FIG. 4 illustrates a replacement cutting assembly 66 for the apparatus 10. Assembly 66 comprises the tubular knife 30, blade 34 and tube 36 together with an additional blade 68 opposite blade 34. The assembly 66 can be installed in place of the original knife 30 and blade 34 to cut apples in halves while coring them.

FIG. 5 illustrates a replacement cutting assembly 70 for the apparatus 10. Assembly 70 comprises the tubular knife 30, blade 34 and tube 36 together with blades 72, 74 and 76. The blades 34, 72, 74 and 76 are spaced at 90° angles around knife 30. The assembly 70 can be installed in place of the original knife 30 and blade 34 to cut apples in quarters while coring them.

Operation of the apple coring apparatus is now described in reference to the FIGURES.

Referring now to FIG. 1 there is shown the apparatus 10 in the initial operating position. The lever arm 20 is in an upright top limit position which is maintained by operation of the spring 48. The blocking arm 54 is held in a forward and downward position by operation of the spring 56. An apple is placed on the spike 50 which serves to hold the apple in position.

Referring now to FIG. 2, the lever arm 20 has been driven downward by application of a force on the grip 23 until the pin 24 has engaged the notch 54a. When this occurs, the blocking arm 54, in a first position, blocks any further downward movement of the lever arm 20. At this point the operator has one hand on the grip 23 and the other hand possibly holding the apple which is mounted on the spike 50. Without the safety apparatus of the present invention it is possible that an inadvertent operator could have his hand in such a position that it could be injured by the tubular knife 30 or the blade 34. However, with the blocking action of the arm 54 the tubular knife 30 and blade 34 cannot be driven downward any lower, thereby protecting the operator's hand.

Referring now to FIG. 3, the operator must depress grip 60 in order to move the handle 58 downward which in turn moves the notch 54a away from the pin 24. This sets blocking arm 54 to a second position. When this occurs the lever arm 20 can be pressed further downward permitting the tubular knife 30 and blade 34 to engage the apple mounted on spike 50. This action serves to core the apple and make one cut through the body of the apple. The spike 50 further serves to hold the apple to prevent it from moving while being cored. The core is forced upward through the tubular knife 30 into the tube 44. As more apples are cored the additional cores are forced out the top of the tubular knife 30, through the tube 44 into a garbage container (not shown).

When the operator raises the lever arm 20 to place another apple on the spike 50, he releases the grip 60. When this occurs, the spring 56 pulls the blocking arm 54 back to its initial position such that it will again engage the pin 24 when the lever arm 20 is lowered.

It can be seen from the above operational description that the operator must utilize both hands, one on the lever arm grip 23 and the other on the handle grip 60, in order to core the apple. This requirement for using two hands reduces the possibility that the operator can be injured in the coring operation.

The apparatus 10 illustrated in FIGS. 1–3 provides a single slice in the apple from the center outward thereby leaving the apple in one piece for baking or in uses requiring horizontal slices. If it is desired to slice apples into halves the assembly 66, shown in FIG. 4, is substituted in place of the original knife 30 and blade 34. This replacement is carried out by removing the bridge member 42 which is releasable by nuts 42a and 42b. If it is desired to slice apples into quarters, the assembly 70, shown in FIG. 5, is installed in place of the original knife 30 and blade 34 as described above for assembly 66.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

I claim:

1. An apple coring apparatus, comprising:
   a base plate,
   a first arm pivotally mounted at a first end thereof to said base plate,
   a lever arm mounted at a first end thereof to the second end of said first arm and including a pin rigidly mounted to said lever arm and extending laterally therefrom,
   a guide rod mounted normal to said base plate,
   a tubular knife pivotally mounted to said lever arm,
   a blade rigidly connected to said tubular knife,
   a sliding tube mounted for axial movement on said guide rod, said sliding tube rigidly connected to said blade,
   blocking means for tensioning said lever arm away from said base plate, and
   means supported by said base plate and having a first position for blocking the travel of said lever arm toward said base plate and having a second position permitting said lever arm to travel toward said base plate to allow travel of said tubular knife toward said base plate, said blocking means comprising a second arm pivotally mounted at a first end to said base plate and having a notch at the second end thereof for receiving said pin, a handle rigidly connected to said second arm, and
   means for tensioning said second arm into said first position for engagement of said pin into said notch when said lever arm is moved towards said base plate wherein the application of force to said handle moves said second arm to said second position.

2. An apple coring apparatus as recited in claim 1 wherein the first end of said first arm and said second arm have a common pivot axis.

3. An apple coring apparatus as recited in claim 1 wherein said means for tensioning said second arm comprises a spring connected between said base plate and said second arm in the region of said notch.

4. An apple coring apparatus, comprising:
   a base plate,
   a guide rod mounted normal to said base plate,
   a first arm pivotally mounted at a first end thereof to said base plate,
   a lever arm pivotally mounted at a first end thereof to the second end of said first arm, said lever arm having a grip at the second end thereof,
   a pin extending laterally from said lever arm,
   a tubular knife pivotally mounted to said lever arm between said first end and said grip, said tubular knife oriented parallel to said quide rod,
   a blade rigidly connected to said tubular knife,
   a sliding tube mounted for axial movement on said guide rod, said sliding tube rigidly connected to said blade, a first spring connected between said sliding tube and said guide rod for tensioning said sliding tube toward the upper end of said guide rod, a second arm pivotally mounted at a first end thereof to said base plate, said second arm having a notch at the second end thereof, a handle rigidly connected to said second arm, a second spring connected between said second arm and said base plate for tensioning said second arm to a first position wherein said notch receives said lever arm pin to prevent further travel of said lever arm toward said base plate, and said handle for moving said second arm to a second position to offset said notch and said second arm from said pin to permit said lever arm to travel toward said base plate.

5. An apple coring apparatus as recited in claim 4 wherein the first ends of said first and second arms have a common pivot axis.

6. An apple coring apparatus as recited in claim 4 including a support member mounted normal to said base plate, said support member connected to said guide rod at the top region thereof for supporting said guide rod.

7. An apple coring apparatus as recited in claim 4 including a spike mounted normal to said base plate and aligned coaxially with said tubular knife.

8. An apple coring apparatus as recited in claim 4 wherein said handle comprises an L-shaped member having a grip thereon, the axis of said grip perpendicular to said lever arm.

* * * * *